United States Patent
Holtzman

(10) Patent No.: US 9,541,955 B2
(45) Date of Patent: Jan. 10, 2017

(54) SYSTEM FOR MODULAR EXPANSION OF MOBILE COMPUTER SYSTEMS

(71) Applicant: Raphael Holtzman, San Mateo, CA (US)

(72) Inventor: Raphael Holtzman, San Mateo, CA (US)

(*) Notice: Subject to any disclaimer, the term of this patent is extended or adjusted under 35 U.S.C. 154(b) by 155 days.

(21) Appl. No.: 14/520,239

(22) Filed: Oct. 21, 2014

(65) Prior Publication Data

US 2015/0109723 A1   Apr. 23, 2015

Related U.S. Application Data

(60) Provisional application No. 61/894,841, filed on Oct. 23, 2013.

(51) Int. Cl.
  *G06F 1/16*   (2006.01)

(52) U.S. Cl.
  CPC ............ *G06F 1/163* (2013.01); *G06F 1/1635* (2013.01); *G06F 1/1652* (2013.01)

(58) Field of Classification Search
  CPC ...... G06F 1/163; G06F 1/1635; G06F 1/1652; G06F 3/011; H05K 5/026; A61B 5/681
  See application file for complete search history.

(56) References Cited

U.S. PATENT DOCUMENTS

| | | | | |
|---|---|---|---|---|
| 6,970,157 B2* | 11/2005 | Siddeeq | ................ | G06F 1/163 345/168 |
| 7,618,260 B2* | 11/2009 | Daniel | ................ | A44C 5/0007 24/311 |
| 8,098,141 B2* | 1/2012 | Vanska | ................ | G06F 1/163 340/407.1 |
| 8,149,212 B2* | 4/2012 | Radley-Smith | ...... | A44C 5/0007 345/156 |
| 8,787,006 B2* | 7/2014 | Golko | .................... | G06F 1/163 361/679.03 |
| 8,988,349 B2* | 3/2015 | Alberth | ................ | G06F 1/163 345/158 |
| 9,017,097 B2* | 4/2015 | Chen | ................... | G06F 13/38 439/528 |
| 9,081,542 B2* | 7/2015 | Dickinson | ............ | G06F 3/0412 |
| 9,098,069 B2* | 8/2015 | Dickinson | ............ | G06F 1/163 |
| 2014/0139454 A1* | 5/2014 | Mistry | ................ | G06F 3/041 345/173 |
| 2014/0240103 A1* | 8/2014 | Lake | ...................... | G08C 17/02 340/12.5 |
| 2014/0279528 A1* | 9/2014 | Slaby | ................. | H04L 63/0853 705/44 |
| 2014/0334083 A1* | 11/2014 | Bailey | .................... | G06F 1/163 361/679.03 |
| 2014/0337621 A1* | 11/2014 | Nakhimov | ............. | G06F 1/163 713/168 |

(Continued)

OTHER PUBLICATIONS

16th Annual Indpependent Inventors Conference, Aug. 15-16, 2014, USPTO, Alexandria VA, Advanced Claim Drafting.*

*Primary Examiner* — Michael Zarroli

(57) ABSTRACT

A system is provided, in which a mobile computing system in a wristwatch form factor incorporates a computing element, a display element, and a belt or strap-like band. A method is proposed, making use of the strap element as a base for expanding the functionality of the system by providing both a mechanical and a data interface between the base system and the expansion module(s).

3 Claims, 4 Drawing Sheets

(56) References Cited

U.S. PATENT DOCUMENTS

| | | | | |
|---|---|---|---|---|
| 2015/0003210 A1* | 1/2015 | Joung | .................... | G04G 17/00 368/10 |
| 2015/0040005 A1* | 2/2015 | Faaborg | .............. | H04M 19/047 715/702 |
| 2015/0378438 A1* | 12/2015 | Reshef | .................... | G06F 3/016 345/173 |
| 2016/0026215 A1* | 1/2016 | Armstrong | .............. | G06F 1/163 320/103 |
| 2016/0106370 A1* | 4/2016 | Filipovic | .............. | A61B 5/6898 340/870.07 |
| 2016/0112684 A1* | 4/2016 | Connor | .................. | H04N 7/185 348/158 |
| 2016/0129310 A1* | 5/2016 | Ahmed | ............... | A61B 5/02405 600/508 |

* cited by examiner

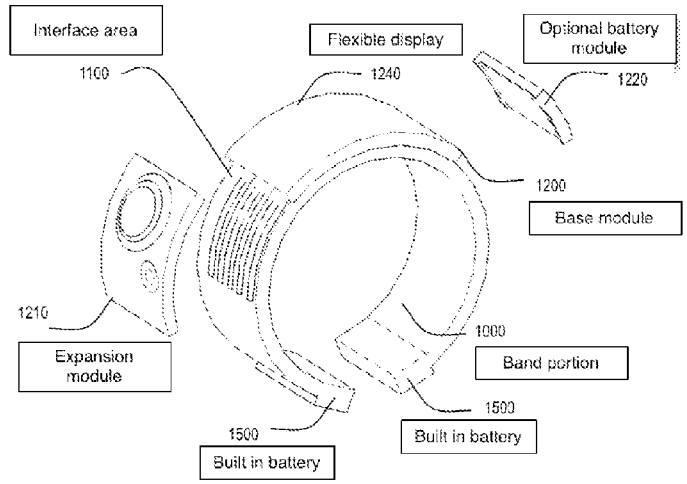

FIG. 6

|  | Key to figures numbering |
|---|---|
| 1000 | Band portion |
| 1100 | Interface area for data signals and (potentially) power |
|  |  |
| 1200 | Base module with any combination of processor, memory, battery, and/or communication |
| 1210 | Expansion module, such as a camera, a microphone, a sensor, etc… |
| 1220 | Optional battery expansion module |
| 1230 | A rigid display for the base module |
| 1240 | A flexible display for the base module |
|  |  |
| 1500 | Build-in rechargeable battery portion |

SYSTEM FOR MODULAR EXPANSION OF MOBILE COMPUTER SYSTEMS

CROSS-REFERENCE TO RELATED APPLICATIONS

U.S. Provisional Application No. 61/894,841. Filed by Raphael Holtzman on 23 Oct. 2013.

STATEMENT REGARDING FEDERALLY-SPONSORED RESEARCH

Not applicable

REFERENCE TO SEQUENCE LISTING, A TABLE OR A COMPUTER PROGRAM LISTING COMPACT DISC

Not applicable

FIELD OF INVENTION

The invention relates to the field of modular elements for mobile computing systems, more specifically of a wristwatch form-factor.

BACKGROUND OF THE INVENTION

A system is described to allow the creation of a modular, configurable, mobile, wrist-carried system. Said system uses the band as a mechanical base and data interface for detachable modules that can attach anywhere on the band and provide various functions, such as computing, display, sound production, and sensing. Rather than relying on traditional methods of data input for mobile computing devices, such as buttons, keyboards, touch-sensitive surfaces, the proposed solution would allow users to upgrade and/or reconfigure the capabilities of each band system by adding modules anywhere on said band or by changing the position of one or more modules on the band.

BRIEF SUMMARY OF THE INVENTION

The proposed solution is a modular, configurable, mobile, wrist-carried system. Said system uses the band as a mechanical base and data interface for detachable modules that can attach anywhere on the band and provide various functions, including, but not limited to, computing, display, sound production, and sensing. Rather than relying on traditional methods of data input for mobile computing devices, such as buttons, keyboards, touch-sensitive surfaces, the proposed solution would allow users to upgrade and/or reconfigure the capabilities of each band system by adding modules anywhere on said band or by changing the position of one or more modules on the band.

BRIEF DESCRIPTION OF THE DRAWINGS

FIG. 6 is a perspective drawing of an example of a system with a flexible display and for which the band is the battery, as described in the third embodiment.

DETAILED DESCRIPTION OF THE INVENTION AND BEST MODE OF IMPLEMENTATION

In preferred embodiments, the present invention proposes a mobile, wrist-carried system that is comprised of a display a detachable module 1210, a processing portion 1200, and a band 1000 of either rigid or flexible material. The band or band-like portion's 1000 main function is to attach said system to various parts of the user's limbs. The system uses the band portion 1000 as an interface to share data and, in some embodiments, power between various expansion modules and as a mechanical base for attaching said modules in any position on said band. The preferred embodiments would allow the upgrade and/or reconfiguration of the capabilities of each band system by adding modules to the band or by changing the position of one or more modules on the band.

Various embodiments are disclosed herein that allow the construction of the system at a relatively low cost for a wide variety of environments and applications. These include the use of a rigid or flexible display and the use of a rigid or flexible band. In most embodiments, the band is used as an interface 1100 allowing data signals and optionally power to be shared between the base system, including the main display and processing portion, and any attached expansion module(s).

Figure 1:
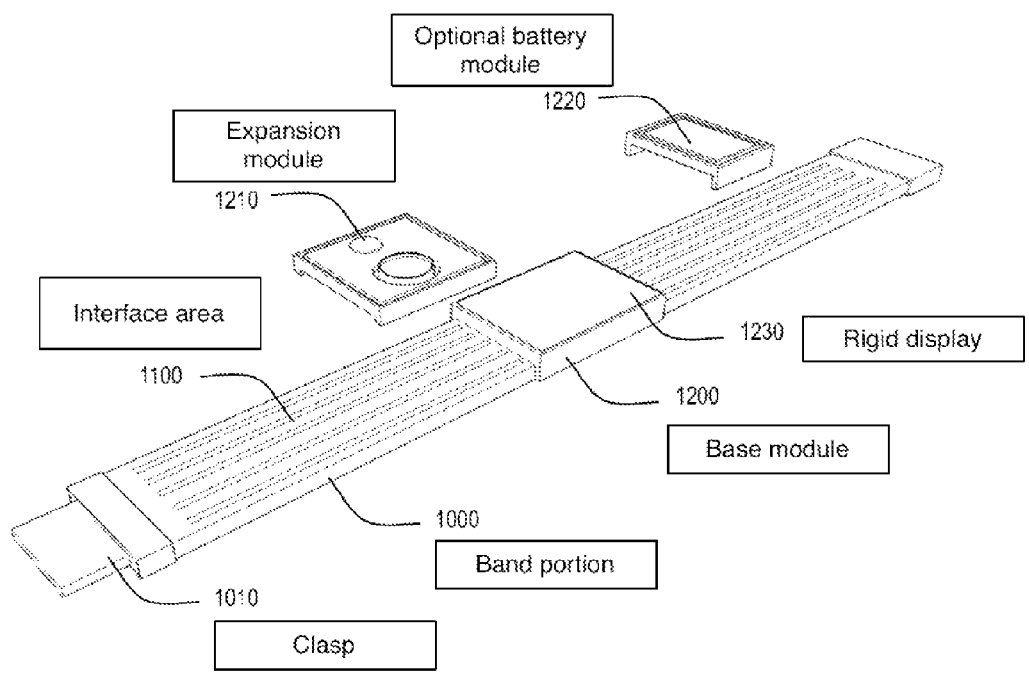
FIG. 1 is a perspective drawing of an example of a system with a rigid display, as described in the first embodiment.
Figure 2:
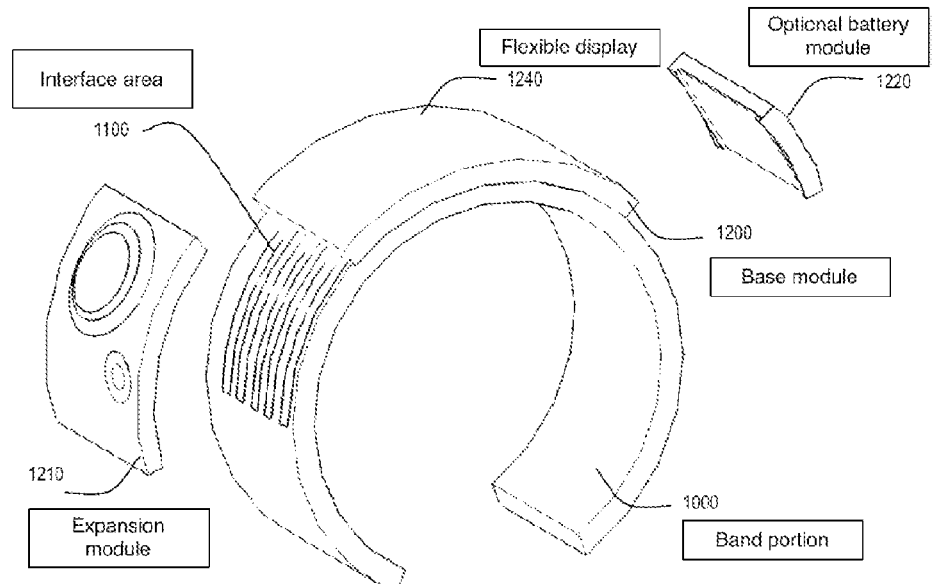
FIG. 2 is a perspective drawing of an example of a system with a flexible display, as described in the first embodiment.
Figure 3:
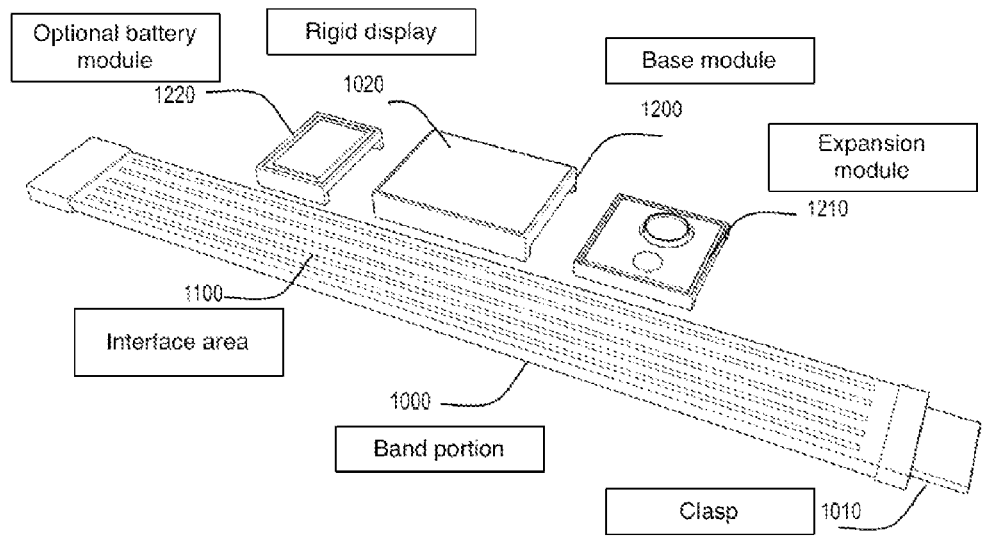
FIG. 3 is a perspective drawing of an example of a modular system with a rigid display, as described in the second embodiment.
Figure 4:
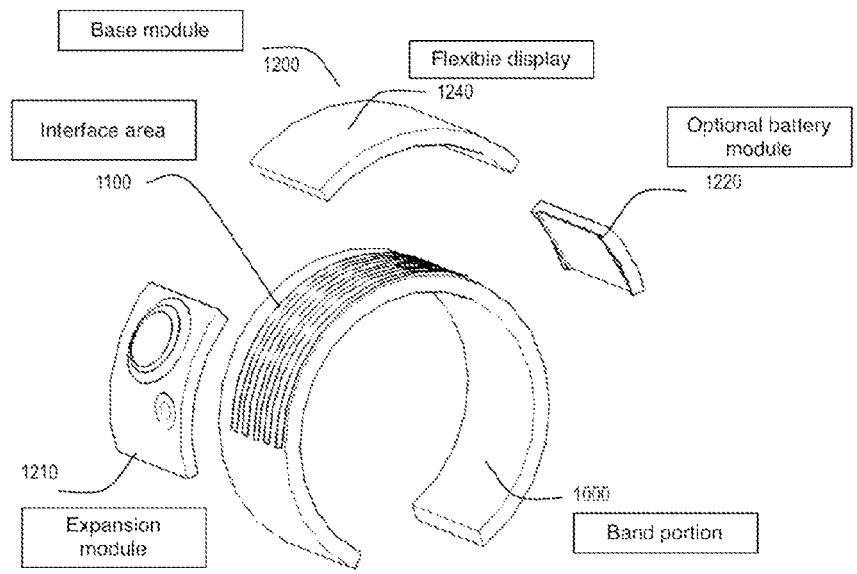
FIG. 4 is a perspective drawing of an example of a modular system with a flexible display, as described in the second embodiment.
Figure 5:
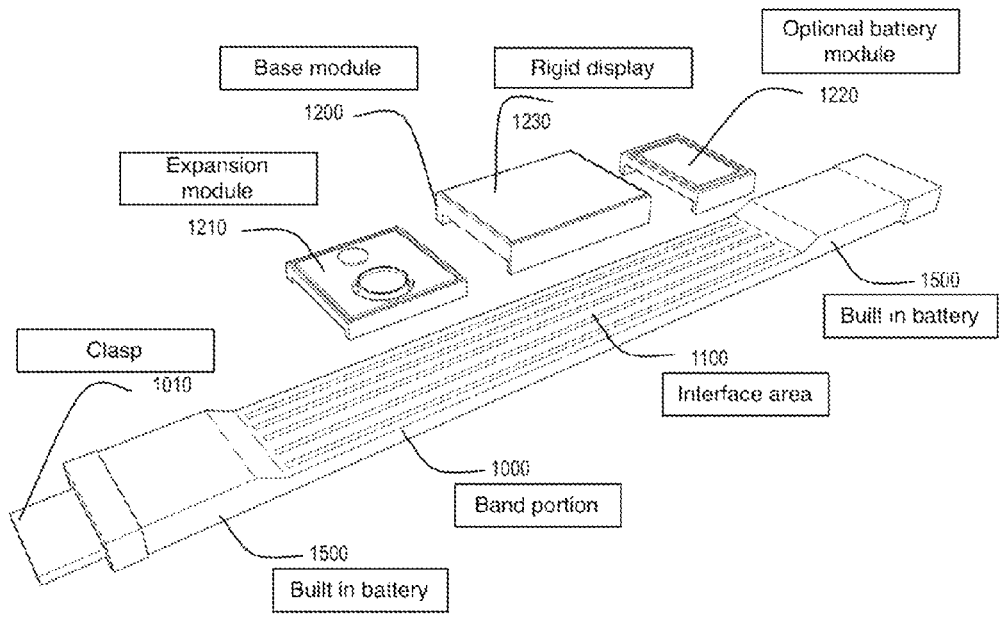
FIG. 5 is a perspective drawing of an example of a modular system with a rigid display and for which the band is the battery, as described in the third embodiment.

A first embodiment of the system can use a rigid display 1230 (as shown by example in FIG. 1) or flexible display 1240 (as shown by example in FIG. 2) together with a band 1000 that can be either flexible or rigid. The base module 1200, which includes the display portion and the processing portion of the system, and the band portion 1000 constitute one unit. The band portion 1000 is used to create an expandable system by attaching various modules 1210, 1220 to it. The modules physically attach to the band to access the data and power lines embedded in the band to interface with the base system 1200 and (optionally) the power source 1220. The modules can be attached by any mechanical means including the use of magnets.

Changing the module position on the band will trigger specific function. For example, a module could be configured with a "start" function that activates any module that is to the right of it, such as a microphone or camera module. In the absence of a "start" or "stop" module, the gesture of placing a module in a specific or relative location on the band could activate a given module. For example: placing a recording module at the top of the band would start a recording function; placing a sensing module at the bottom of the band would activate a Geiger counter function; or placing the camera module to the right side would enable video capturing, while moving it to the left would enable static image capture.

In other embodiments, the gesture of moving a module along the band would activate one or more specific functions of the module. For example, moving an "emergency alert" module along the band would broadcast a distress call, or moving a "business card" module would activate the transfer of contact information to a nearby receiver. In other embodiments, the gesture of joining two or more modules would configure the modules for a specific function in addition to their individual functions. For example, joining the "business card" module to the "emergency alert" module would broadcast a distress call that includes not only the user's contact information, but also his/her medical history.

I claim:

1. A system enabling the expansion of a mobile computing system comprising:
   a. a band or band-like portion configured to:
      i. attach said system to one or more of the user's limbs,
      ii. allow one or more expansion modules to be attached in any position on said band, and
      iii. provide an interface for carrying data signals between modules;
   b. at least one detachable module configured to:
      i. attach anywhere on said band by magnets or mechanical springs,
      ii. connect to said data-carrying interface to receive data signals, and
      iii. activate one or more specific functions that are determined by the particular position of said module on said band.

2. The system of claim 1, wherein the gesture of joining two or more said modules configures said modules for a specific function associated with the joining of those specific modules.

3. The system of claim 1, wherein the gesture of moving said module along said band activates one or more specific functions of said module.

* * * * *